United States Patent [19]

Mays

[11] E Re. 29,070

[45] Reissued Dec. 14, 1976

BEST AVAILABLE COPY

[54] ATTACHMENT FOR REMOVABLY SUPPORTING A PARTIAL DENTURE

[76] Inventor: Ralph C. Mays, 1139 N. Gary, Tulsa, Okla. 74110

[22] Filed: June 25, 1974

[21] Appl. No.: 483,375

Related U.S. Patent Documents

Reissue of:

[64] Patent No.: 3,672,057
Issued: June 27, 1972
Appl. No.: 89,238
Filed: Nov. 13, 1970

[52] U.S. Cl. ..... 32/5
[51] Int. Cl.[2] ..... A61C 13/22
[58] Field of Search ..... 32/5

[56] References Cited

UNITED STATES PATENTS

| | | | |
|---|---|---|---|
| 1,673,286 | 6/1928 | Inoue | 32/5 |
| 2,279,351 | 4/1942 | Skinner | 32/5 |

*Primary Examiner*—Robert Peshock
*Attorney, Agent, or Firm*—Head, Johnson & Chafin

[57] ABSTRACT

An attachment for removably securing a partial denture to an adjacent natural tooth including a gudgeon member affixed to a natural tooth including a flat portion having a pinhole therein, a locking bar having at the first end a perpendicular extending pin portion of a diameter to be received in the gudgeon member pinhole and at the other end a hinge pin opening, a hinge pin pivotally received in the locking bar hinge pin opening, the hinge pin being adaptable to be affixed within a partial denture.

16 Claims, 16 Drawing Figures

ATTACHMENT FOR REMOVABLY SUPPORTING A PARTIAL DENTURE

Matter enclosed in heavy brackets[ ]appears in the original patent but forms no part of this reissue specification; matter printed in italics indicates the additions made by reissue.

*CROSS REFERENCE TO RELATED APPLICATION*

*This application is for a re-issue of my U.S. Pat. No. 3,672,057, issued June 27, 1972, and entitled "Attachment for Removably Supporting a Partial Denture To An Adjacent Natural Tooth."*

BACKGROUND, SUMMARY AND OBJECTS OF THE INVENTION

A high percentage of people are required, during some portion of their life, to wear partial dentures which are retained in position in the mouth by support in one form or another to an adjacent natural tooth or between two spaced apart natural teeth. For many years the use of various clasp type devices have been utilized by dentists, such device fitting firmly around adjacent natural teeth. While such devices function satisfactorily, to an extent, they do have disadvantages and limitations. One of the problems with clasp type devices is that in order to securely hold the partial denture in place they must grasp the natural tooth or teeth fairly securely. This means that as they are placed in the mouth or removed strain and stress is placed on the natural tooth or teeth. Of greater significance, clamps engaging a natural tooth tend to cause the tooth to move as the user chews food which, after a length of time, can result in the impairment of the natural tooth by the stress placed upon it by adjacent dentures.

In order to circumvent the disadvantage of clasp type partial dentures others have suggested various types of apparatus for locking the partial dentures into place, such as U.S. Pat. Nos. 1,727,653 and 3,436,825.

This invention provides an improved attachment means for removably supporting a partial denture to a natural tooth and having advantages over other known types of apparatus or means for supporting partial dentures. One of the advantages of the invention is to provision of means whereby the pivotation of the partial denture during chewing can take place around the attachment means with minimum stress and strain on the natural tooth to which the partial denture is supported. Another advantage of the attachment means of this invention is the safety of use obtained in that a positive locking means is achieved for locking a partial denture to a natural tooth, not depending upon springs or tension fits, thus eliminating the chance that the denture can be dislodged while the user is chewing sticky food, such as taffy candy, or while the user is asleep and possibly thereby become accidentally swallowed.

In addition, the attachment means of this invention does not engage the gum tissues around the natural teeth to which it is affixed and thus does not irritate tissue as does some existing types of friction clasping means.

Another advantage of the attachment means of this invention is that it is designed for use interiorly of the partial dentures and thereby is hidden from view from the outside of the mouth for improved appearance of the user. Another advantage is the ease of removing the attachment means when it is desired to remove the partial denture from the mouth.

It is therefore an object of this invention to provide an improved attachment for removably supporting a partial denture to a natural tooth.

More particularly, it is an object of this invention to provide an attachment for removably supporting a partial denture to an adjacent natural tooth having the advantages and improvements aforementioned.

Still more particularly, an object of this invention is to provide an attachment for removably supporting a partial denture to a natural tooth including a gudgeon member adaptable to be affixed to a natural tooth, the member having a pinhole opening therein, a locking bar having one end adaptable to be pivotally supported to a partial denture, the other end having an extending pin portion which, when pivoted to the closed position, extends within the pinhole in the gudgeon member for locking the partial denture into position.

These and other objects will be fulfilled by the attachment means to now be described in the following specification and claims, taken in conjunction with the attached drawings.

DESCRIPTION OF VIEWS

DETAILED DESCRIPTION

Figure 1:
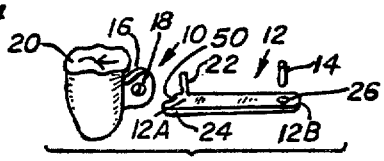
FIG. 1 is an isometric view of the elements making up the denture attachment of this invention.

Referring to the drawings and first to FIG. 1, the basic elements making up the invention are shown. The invention is an attachment for removably supporting a partial denture to an adjacent natural tooth and includes three essential elements which are: (1) a gudgeon member generally indicated by the numeral 10 which is adaptable to be affixed to a natural tooth; (2) a locking bar 12; and (3) a hinge pin 14 which pivotally supports the locking bar and is adaptable to be affixed within a partial denture.

The gudgeon member includes, in its most elementary form, a flat portion 16 which extends in the plane of the alveolar ridge adjacent to the natural tooth on which the partial denture is to be positioned. The flat portion has a pinhole 18 therein, the axis of which is perpendicular to the plane of the flat portion. In the preferred arrangement the configuration of the periphery of the flat portion 16 is circular except that portion immediately adjacent to the natural tooth from which it extends. The pinhole 18 is axially of such circular configuration.

In the practical application of the invention the flat portion 16 of the gudgeon member must be secured in some way to a natural tooth. The most obvious means of accomplishing this is to form the flat portion 16 integrally with a cap 20 which is configured to be placed over a prepared natural tooth and secured to it. The flat portion 16 may be secured integrally either by casting the cap 20 and flat portion 16 simultaneously or by welding or fusing the flat portion 16 to the cap 20.

Locking bar 12 has a first end 12A and a second end 12B. The first end 12A includes a perpendicular extending integral pin portion 22 of a diameter to be received in the pinhole 18 of the gudgeon member. The first end 12A in addition includes an integral reduced width grasping projection 24 parallel to the longitudinal axis of the locking bar and at the side thereof opposite the pin portion 22. The grasping portion 24 is adaptable to be grasped with a fingernail of the user for pivotation of the locking bar and moving it from closed to opened position as will be described in more detail subsequently.

The second end 12B of locking bar 12 includes a hinge pin opening 26, the axis of which is perpendicular to the plane of the pin portion 22. The diameter of opening 26 is such as to pivotally receive hinge pin 14.

Figure 5A:
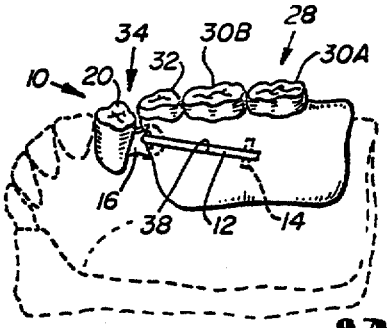
FIG. 5A is a cutaway view of a portion of the lower jaw (in dotted outline) of a typical patient utilizing and showing a partial denture incorporating the attachment means in a locked position.
Figure 5B:
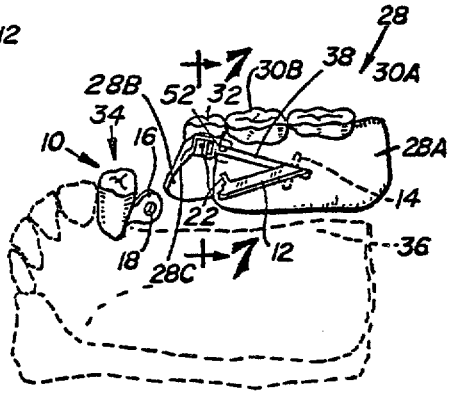
FIG. 5B shows the arrangement of FIG. 5A but showing the attachment means locking bar in open position and the partial denture removed from locked position.

Referring to FIGS. 5A and 5B a typical partial denture incorporating the attachment means of this invention is shown. The partial denture is indicated generally by the numeral 28 and includes two artificial molars 30A and 30B, and an artificial bicuspid tooth 32. The partial 28 is supported to a natural bicuspid tooth indicated generally by the numeral 34. The natural bicuspid tooth 34 is encompassed by a cap 20 having the gudgeon member flat portion 16 integrally extending therefrom. The partial denture 28 is of the usual type having plastic portion 28A resembling the gums and including a recess 28B configured to conform to the alevolar ridge 36 of the patient in the area from which the natural teeth are missing. A slot 38 is formed in the denture artificial gum portion 28A and pivotally receives the locking bar 12.

Figure 7:
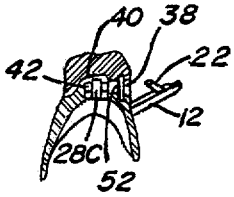
FIG. 7 is a cross-sectional view taken along the line 7—7 of FIG. 5B.
Figure 4A:
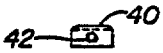
FIG. 4A is a side view of a reinforcing member which may be used with the basic elements of FIG. 1.
Figure 4B:
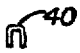
FIG. 4B is an end view of the reinforcing member of FIG. 4A.

The recess 28B formed in the partial denture 28 includes a narrow portion 28C (see FIG. 7) of a width to snugly but pivotally receive the flat portion 16 of the gudgeon member. In order to reinforce the narrow portion 28C of the recess 28B the use of a reinforcing member 40, as best shown in FIGS. 4A, 4B and 7, may be employed. The reinforcing member 40 is a small metallic element having a U-shaped cross-sectional configuration of an interior width to snugly but pivotally receive the flat portion 16 of gudgeon member 10. The reinforcing member has an opening 42 therein which receives the pin portion 22 of the locking arm when the locking arm is in closed position so that, when in closed position, the pin portion 22 extends through the opening 42 in the reinforcing member and opening 18 in the gudgeon member flat portion. While the use of the reinforcing member 40 is not mandatory to the application of the invention its use is recommended since most partial dentures are formed of plastic or ceramics, or a combination of both, and the metal reinforcing member adds increased life to the partial denture.

Figure 6A:
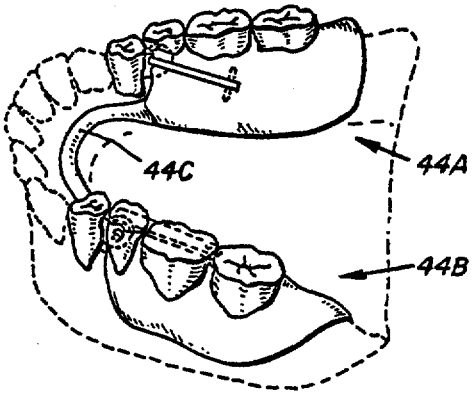
FIG. 6A is an isometric view of the lower jaw (in dotted outline) showing the application of the invention to a partial denture in which false teeth are provided on each side of the mouth and showing the application of the attachment means of this invention.
Figure 6B:
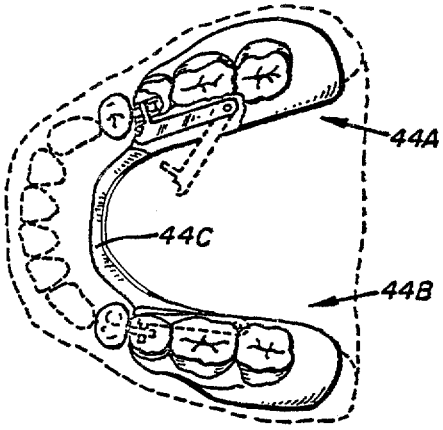
FIG. 6B is a top view of the arrangement of FIG. 6A showing the upper portion of the partial denture partially cutaway to show the attachment means of this invention with the locking bar in closed position in solid outline and in open position in dotted outline and showing the attachment means in closed position in the lower portion of the partial denture.

FIGS. 6A and 6B show another illustration of the method of utilizing the invention. In this arrangement a partial is provided having left and right false teeth to either side of the incisors and canine teeth of the user, the portions of the partial denture being indicated by the numerals 44A and 44B. The portions 44A and 44B are connected by a metal bar 44C which extends between the two and conforms as closely as possible to the interior configuration of the forward part of the user's mouth. The attachment of this invention is utilized as previously discussed with reference to FIGS. 5A and 5B, the only difference being that attachment is provided with both portions 44A and 44B so that when both locking bars are in closed position the partial is secured to both sides of the mouth of the user.

Figure 3C:
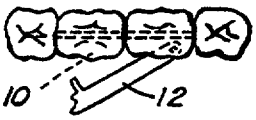
FIG. 3C is a view of the partial denture of FIG. 3B in position on the gudgeon member of FIG. 3A showing the locking bar in open position.
Figure 3B:
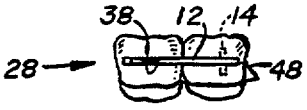
FIG. 3B is a side view of the partial denture for use with the gudgeon member of FIG. 3A.
Figure 3A:
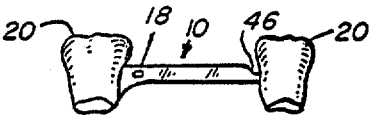
FIG. 3A is a side view of an alternate embodiment of this invention wherein the gudgeon member extends between spaced apart caps adaptable to be positioned upon spaced apart natural teeth to support a removable partial denture therebetween.

FIGS. 3A, 3B and 3C show an additional alternate application of the invention. FIG. 3A shows an arrangement of a gudgeon member 10 extending between two caps 20 which are configured to be secured over prepared natural teeth. Opening 18 is provided in the gudgeon. In addition, a notch 46 is configured in the gudgeon member adjacent one of the caps 20. FIG. 3B shows a side view of a two artificial teeth partial for use with the gudgeon member of FIG. 3A. The hinge pin 14 secured in the partial denture 28 and the locking bar 12 is pivoted around the hinge pin 14 in a slot 38 as previously described. In addition, the partial denture 28 of FIG. 3B includes an integral projecting portion 48 which, when the partial is placed in position on the gudgeon of FIG. 3A, is fitted into the notch 46. Locking bar 12 is then placed in closed position as shown in dotted outline in FIG. 3C to lock the partial into position. While FIGS. 3A, 3B and 3C show the arrangement wherein two artificial teeth are interposed between two spaced apart natural teeth with the gudgeon member extending therebetween such arrangement may be used whether there is one, two, three or more artificial teeth making up the denture partial.

Figure 2A:
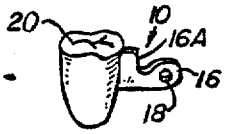
FIG. 2A is an isometric view of a gudgeon member portion of the attachment of this invention having improved stabilizing means.
Figure 2B:
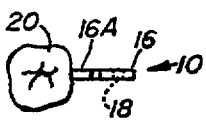
FIG. 2B is a top view of the gudgeon member of FIG. 2A.

FIGS. 2A and 2B show an alternate embodiment of the gudgeon portion 10. The alternate arrangement includes an integral stabilizer portion 16A as a part of the flat portion 16 extending from cap 20. Stabilizer portion 16A is adjacent the cap 20 and, when applied to a partial denture of the type shown in FIGS. 5A, 5B, 6A and 6B extends within the narrow portion 28C of the recess in the partial denture, or within reinforcing member 40, to add stability to the partial denture.

In a sense, the invention encompasses a partial denture and one or more capped normal teeth to which the denture is supported. However, in practical application, every partial denture is custom made to the precise configuration of the mouth of the user. Thus the practicing dental technician will utilize the invention by incorporating the basic elements thereof including those shown in FIG. 1 and preferably including also the reinforcing member of FIGS. 4A and 4B into custom-made partial dentures.

An additional alternate embodiment of the invention includes a locking means to prevent the locking bar from inadvertently being moved from the closed position. The first end 12A of the locking bar includes a locking recess 50 between the pin portion 22 and the grasping projection 24 (See FIG. 1). A spring lock 52 (See FIG. 7) is encompassed in the partial denture adjacent recess 28C. When the locking bar 12 is in closed position the spring lock 52 engages the locking recess 50 to prevent the locking bar being moved from the closed position until sufficient force is applied to the grasping projection. The spring lock 52 may be supported to the reinforcing member 40 to simplify casting of this element with a denture.

Figure 8:
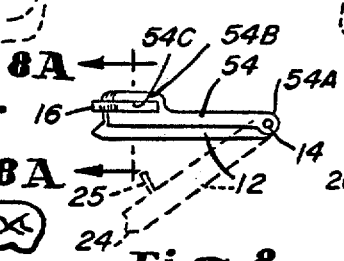
FIG. 8 is a top view of an alternate embodiment of the invention including a case portion.
Figure 8A:
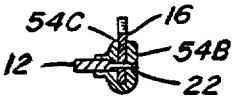
FIG. 8A is a cross-sectional view taken along the line 8A—8A of FIG. 8.
Figure 8B:
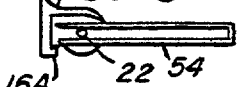
FIG. 8B is a side view of the embodiment of FIG. 8.

FIGS. 8, 8A and 8B show an alternate embodiment of the invention. A case 54 has an opening 54A in one end which receives pivot pin 14. The locking bar 12 is pivoted to the case 54, which preferably is of a U-shaped cross-sectional configuration to receive the locking bar at least partially therein in the manner that the blade is received in a pocket knife. Integral with the case, and at the end thereof opposite opening 54A, is enlarged portion 54B having a recess 54C. The gudgeon member 16 is pivotally received in recess 54C. This embodiment is self-contained with the case 54, having locking bar 12, ready to be incorporated directly into a partial denture.

While the invention has been described with a certain degree of particularity it is manifest that many changes may be made in the details of construction and the arrangement of components without departing from the spirit and scope of the disclosure. It is understood that the invention is subject to a great variety of alternate embodiments each of which will be predicated upon the specific partial denture required to fill the needs of individual users. It is understood that the invention is not limited to the specific exemplary embodiments set forth herein but only by the scope of the claim or claims, including the full range of equivalency to which each element or step thereof is entitled.

What is claimed:

1. An attachment for removably supporting a partial denture to an adjacent natural tooth comprising:

a gudgeon member adaptable to be affixed to a natural tooth including a flat portion extending in the plane of the alveolar ridge adjacent the natural tooth on which a denture is to be positioned, the flat portion having a pinhole therein the axis of which is perpendicular the plane of the flat portion;

a locking bar having a first and second end, the first end having a perpendicular extending integral pin portion of a diameter to be received, when the locking bar is in closed position, in said gudgeon member pinhole, the second end having a hinge pin opening therein, the axis of the hinge pin opening being perpendicular the plane of the pin portion; and a hinge pin pivotally received in said locking bar hinge pin opening, the hinge pin being adaptable to be received in a partial denture.

2. An attachment for removably supporting a partial denture to an adjacent natural tooth according to claim 1 wherein said flat portion of said gudgeon member is circular in all of the exterior configurations except that portion adjacent the part adaptable to be affixed to a natural tooth, the pinhole being in the center of such circular peripheral configuration.

3. An attachment for removably supporting a partial denture to an adjacent natural tooth according to claim 1 wherein said locking bar first end includes an integral reduced width grasping portion projecting parallel the longitudinal axis of the locking bar and at the side thereof opposite said pin portion, such grasping portion being adaptable to be grasped with the fingernail for pivotation of the locking bar.

4. An attachment for removably supporting a partial denture to an adjacent natural tooth according to claim 1 wherein said gudgeon member is an integral portion of a cap adaptable to be secured over a prepared natural tooth.

5. An attachment for removably supporting a partial denture to an adjacent natural tooth according to claim 1 wherein said gudgeon member is in the form of a flat bar extending between spaced-apart natural teeth, the plane of said bar being in the plane of the alveolar ridge between the natural teeth, and said pinhole being adjacent one of the natural teeth.

6. An attachment for removably supporting a partial denture to an adjacent natural tooth according to claim 5 wherein said gudgeon member flat bar has a cap portion at each end thereof, each cap portion being adaptable to be secured over a prepared natural tooth.

7. An attachment for removably supporting a partial denture to an adjacent natural tooth according to claim 1 including means of retaining the locking bar in closed position.

8. An attachment for removably supporting a partial denture to an adjacent natural tooth according to claim 7 wherein said locking bar first end includes a locking recess adjacent said pin portion, and including a spring lock member adaptable to be received in a partial denture and positionable therein to engage said locking recess when said locking bar is in closed position.

9. An attachment for removably supporting a partial denture to an adjacent natural tooth according to claim 1 including a case member having, at one end thereof, an opening receiving said hinge pin whereby said locking bar is pivotally supported thereto, and having, at the other end thereof, a recess for pivotally receiving said gudgeon member.

10. An attachment for removably supporting a partial denture to an adjacent natural tooth according to claim 9 wherein said case member is U-shaped in cross-section in a plane perpendicular the longitudinal axis and configured to partially receive said locking bar therein throughout substantially the full length of said locking bar when in the closed position.

*11. An attachment for removably supporting a partial denture within a mouth and comprising:*

*a member adaptable to be affixed within the mouth including a flat portion extending in the plane of the alveolar ridge within the mouth adjacent to which a denture is to be positioned, the flat portion having a pinhole therein the axis of which is perpendicular the plane of the flat portion;*

*a locking bar having a first and second end, the first end having a perpendicular extending integral pin portion of a diameter to be received, when the locking bar is in closed position, in said member pinhole, the second end having a hinge pin opening therein, the axis of the hinge pin opening being perpendicular the plane of the pin portion; and*

*a hinge pin pivotally received in said locking bar hinge pin opening, the hinge pin being adapted to be received in a partial denture.*

*12. An attachment for removably supporting a partial denture within a mouth according to claim 11 wherein said locking bar first end includes an integral reduced width grasping portion projecting parallel the longitudinal axis of the locking bar and at the side thereof opposite said pin portion, such grasping portion being adaptable to be grasped with the fingernail for pivotation of the locking bar.*

*13. An attachment for removably supporting a partial denture within a mouth according to claim 11 including means of retaining the locking bar in a closed position.*

*14. An attachment for removably supporting a partial denture within a mouth according to claim 13 wherein said locking bar first end includes a locking recess adjacent said pin portion, and including a spring lock member adaptable to be received in a partial denture and positionable therein to engage said locking recess when said locking bar is in closed position.*

*15. An attachment for removably supporting a partial denture within a mouth according to claim 11 including a case member having, at one end thereof, an opening receiving said hinge pin whereby said locking bar is pivotally supported thereto, and having, at the other end thereof, a recess for pivotally receiving said member.*

*16. An attachment for removably supporting a partial denture within a mouth according to claim 15 wherein said case member is U-shaped in cross-section in a plane perpendicular the longitudinal axis and configured to partially receive said locking bar therein throughout substantially the full length of said locking bar when in the closed position.*

* * * * *